March 19, 1935.  F. E. STAHL  1,994,794

APPARATUS FOR FORMING CHAIN LINK BLANKS

Filed Aug. 11, 1933  2 Sheets-Sheet 1

INVENTOR
FRANK E. STAHL
By
ATTORNEY

March 19, 1935.　　F. E. STAHL　　1,994,794
APPARATUS FOR FORMING CHAIN LINK BLANKS
Filed Aug. 11, 1933　　2 Sheets-Sheet 2
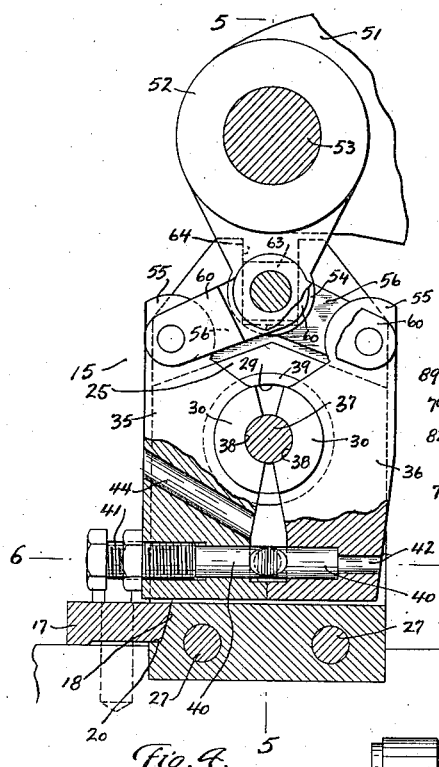
Fig. 5.　INVENTOR
FRANK E. STAHL
By
ATTORNEY Patented Mar. 19, 1935

1,994,794

UNITED STATES PATENT OFFICE 1,994,794

APPARATUS FOR FORMING CHAIN LINK BLANKS

Frank E. Stahl, Tonawanda, N. Y., assignor to Columbus McKinnon Chain Corporation, Tonawanda, N. Y., a corporation of New York Application August 11, 1933, Serial No. 684,684

8 Claims. (Cl. 59—1)

My invention relates in general to forming machinery for chain link blanks, and in particular, to a cut-off mechanism for forming link blanks having novel ends.

The blank shown in this application, after being formed on a chain former of any well known type, has its ends united by electric butt welding. It is well known to those skilled in the art that when welding the link having the ordinary flat, substantially parallel faces, gas pockets are sometimes formed and foreign matter is entrapped in the weld so that the strength of the link at the weld is dangerously reduced. This is particularly true in links made from the larger sizes of wire, and also it is particularly true in the use of wire made from tool steel or alloy steels.

I have discovered that if the ends of the blank are chisel shaped or otherwise have their cross-sectional areas gradually reduced from the body part to the extreme tip of the end, the welding will occur from the central portion of the joint and will spread outwardly until the entire area is welded, thus preventing the formation of air or gas pockets and producing a weld which is substantially perfect.

One of the objects of my invention has been, therefore, to provide a blank having similarly shaped ends, which, when formed in a chain former and brought together, will weld from the center outwardly.

Another object has been to provide a device for cutting such blanks so that novel ends shall be provided thereon.

Another object has been to provide cutters or tools having chisel shaped ends, such ends preferably having a stepped formation, whereby a strong durable point shall be provided and one which shall enter the metal so as to produce as narrow an edge at the end of the blank as is practically possible.

Furthermore, my invention is designed primarily to be used in connection with a chain forming machine and to be operated by some reciprocating part of such machine.

The above objects and advantages have been accomplished by the device shown in the accompanying drawings, of which:

Fig. 3 is a side elevation of my chain link blank.

Fig. 4 is an enlarged, fragmentary, sectional elevation of my cut-off mechanism.

Fig. 5 is a sectional view of the same, taken on line 5—5 of Fig. 4.

Fig. 6 is a sectional, plan view, taken on line 6—6 of Fig. 4.

Fig. 7 is an enlarged, side elevation of one of the cut-off tools of my device.

Fig. 8 is an end elevation of the same.

Figure 1:
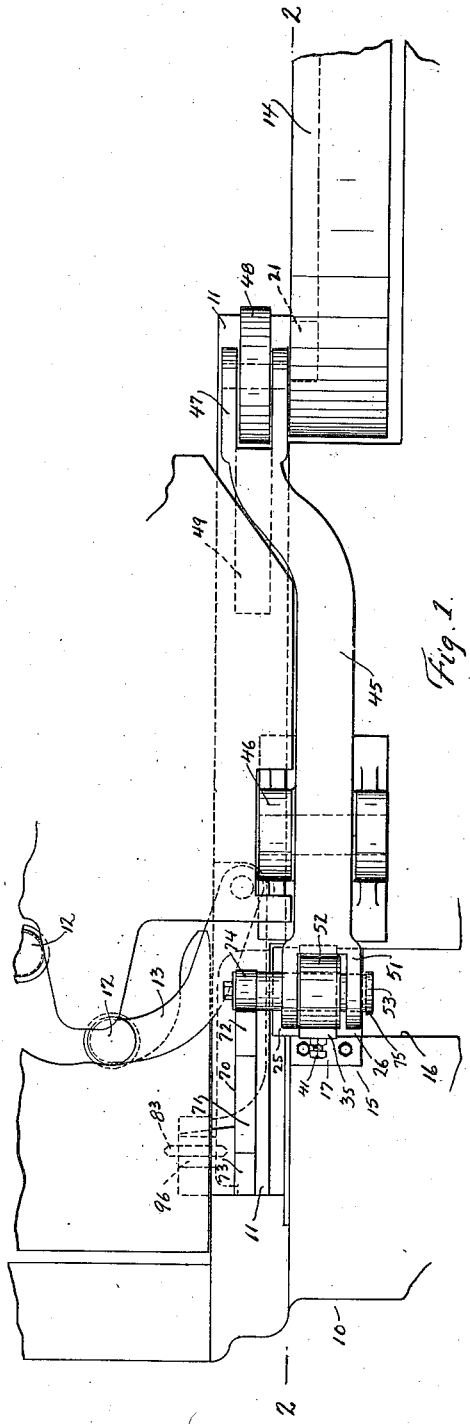
Fig. 1 is a plan view of my device shown attached to a chain forming machine with fragmentary portions, only, thereof shown.

As above pointed out, by device is designed especially to be used in connection with a chain forming machine. In order to illustrate the manner of operation of the device, I have shown in Figs. 1 and 2 fragmentary portions, somewhat in diagram, of a chain forming machine. As here shown, 10 is the bed of the machine and 11 is one of the forming slides thereof. There are, of course, two such slides on each of these machines for actuating the forming rolls 12. Each of these rolls is carried by an arm 13 which has one of its ends pivotally attached in a suitable recess formed in the slide. I also show in Fig. 1 a fragmentary portion of one of the cams 14 for operating the slide 11 through the medium of the slide roller 21.

My cut-off device is shown at 15 and is suitably mounted in a groove 16 upon the bed 10 of the chain forming machine and is adjustably held in such groove by means of a block clamp 17. This clamp has an inner tapered edge 18 (see Fig. 4) which engages the inner face of a recess 19 formed along the edge of the cut-off device. A ledge 20 is formed at the bottom of the recess with which the clamp also engages to firmly hold the cut-off device in position.

Referring now specifically to Figs. 4, 5 and 6, the cut-off device comprises a toggle frame 25 and a side plate 26. This frame and plate are arranged in interspaced relation and are held together by means of bolts 27. A leg 28 is formed on the toggle frame at the lower edge thereof and this contacts with the side plate 26 and acts as a spacer. In the inner faces of the toggle frame and side plate are formed annular recesses 29 with which are engaged the extended cylindrical bosses 30 of the front cutter arm 35 and the rear cutter arm 36. These cutter arms are mounted between the toggle frame and side plate and are held in spaced relation with each other by means of a cutter arm pin 37 which engages with a circularly formed recess 38 provided in each of the opposite faces of the circularly shaped bosses 30. As shown in Fig. 4, these bosses do not form a complete cylinder, but are cut away along radial lines at each side of the center, thus permitting the cutter arms to oscillate about the cutter arm pin and within the annular recesses 29 of the toggle frame and side plate. As shown in the drawings, the recesses 29 are lined with a renewable, hardened bushing 39.

A cut-off tool 40 is carried at the lower end of the front cutter arm and the rear cutter arm. Each of these tools is mounted in a suitable aperture formed in the end of each arm and an adjusting screw 41 is provided in the front cutter arm and arranged on the same axis as the tool 40 and it provides means for adjusting the position of the tool with respect to the tool carried by the rear cutter arm. An aperture 42 is preferably provided in the rear cutter arm behind the tool so that it may be conveniently removed when necessary. One of the tools is shown enlarged in Figs. 7 and 8, and each of them is provided with a flattened surface 42 with which a set screw 43 is engageable for securing the tools in place. The cutting end 34 of each tool is substantially V-shaped having its chisel edge diametrically arranged and the surfaces of such end are preferably provided with angularly arranged stepped surfaces 57, 58 and 59. The angle which each successive step makes with the axis of the tool is increased from the point to the body of the tool. Thus the extreme point of the tool formed between the oppositely arranged stepped surfaces 57 is relatively sharp whereby it will penetrate into the stock forming the blank and cut it off in such a manner that the extreme edge of the point will be relatively narrow. The inclination of the oppositely arranged stepped surfaces 59 is, however, preferably such that the angle of the point of the blank formed thereby will be proper for welding. A peep hole 44 is provided in the front cutter arm so that the cut-off tools may be observed not only during their adjustment, but also during their operation.

Figure 2:
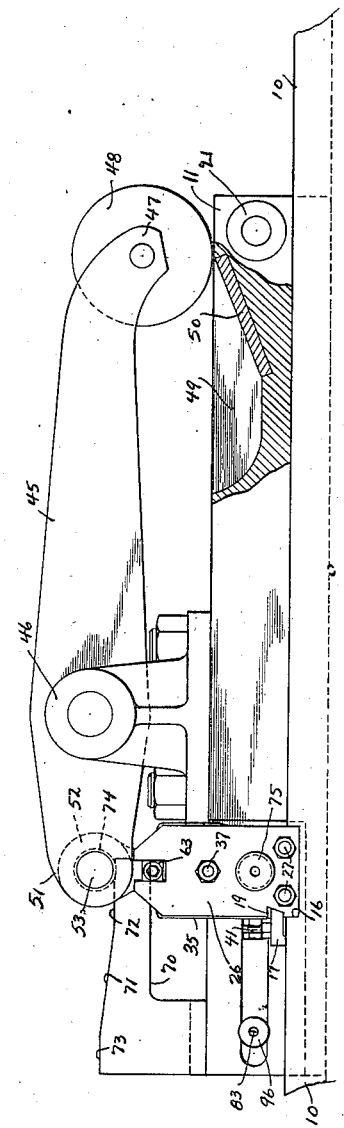
Fig. 2 is a side, fragmentary, sectional elevation of the apparatus shown in Fig. 1, and is taken on line 2—2 of Fig. 1.

A rocker arm 45 is provided for actuating my cut-off mechanism and this arm is pivotally mounted in brackets 46, carried by the bed 10 of the machine. The rearwardly extending end 47 of this arm is offset, as shown in Fig. 1, and the extreme end thereof is bifurcated and carries a rocker arm roller 48. This roller is arranged immediately over the forming machine slide 11 and this slide is formed with a longitudinal recess 49. An insert 50 is mounted in the recess and is arranged on an inclined plane, as shown in Fig. 2, whereby when the slide 11 is reciprocated to the right, as shown in Fig. 2, the rocker arm roller 48 will roll down the incline into the recess 49 and when the slide is moved to the position shown in Fig. 2 the rear end of the arm will be raised by the roller 48 which will ride up on the insert 50 to the elevation of the top surface of the slide as shown in Fig. 2. The forward end 51 of the rocker arm is arranged over my cut-off mechanism 15. This end is also bifurcated and arranged in this end is a rocker arm connection 52. The arm and connection are pivotally united by means of an upper rocker arm connecting pin 53. The lower end 54 of the rocker arm connection is cylindrically formed, and the upper ends 55 of the front and rear cutter arms are also cylindrically formed. Between the cylindrical surface of the end 54 and the cylindrical surface of each of the ends 55 of the cutter arms is arranged a toggle spacer 56. These spacers are each formed with concave, cylindrical surfaces, which engage the cylindrical surfaces just described and which serve to connect the rocker arm connection to the front and rear cutter arms in a very rigid and durable manner. Obviously, the force exerted by the rocker arm connection is transmitted to the cutter arms through the toggle spacers on the down or power stroke of the cutter. So as to return the cutter arms to their open position, a return link 60 is provided at each side of the front and rear cutter arms. The upper ends of each pair of return links 60 are reduced in width where they engage and a lower rocker arm connection pin 61 is passed through each pair of return links and through the lower end 54 of the rocker arm connection. The lower rocker arm connection pin has each of its ends 62 extended outwardly and passing through a connection guide block 63. Each of these connection guide blocks is slidably mounted within a recess 64 formed in the upper end of the toggle frame 25 and the side plate 26. The lower end of the rocker arm connection is thus guided in its movement.

When the parts are in the position shown in Figs. 1 and 2 and the slide is in its forward position, the cut-off mechanism is being operated and a link blank has just been completely formed in the forming machine. When the slide 11 has returned to its extreme inner position, the rocker arm roller 48 will drop into the recess 49 in the slide and raise the forward end 51 of the rocker arm, thus opening the tools at which time the wire will be fed into the cut-off mechanism and the blank previously cut will be carried forwardly into the formers of the machine. Should, however, for any reason, the roller 48 fail to enter the recess 49, the cutting tools would not be opened and when the wire was fed, the machine would become jammed. It is necessary, therefore, to provide some positive means for making sure that the cutters will always be open at the right time. To accomplish this I provide a return arm 70 which is suitably secured to the forward end of the slide 11. The upper face of this return arm is provided with an inclined surface 71 which connects two horizontal surfaces 72 and 73. A return roller 74 is carried at the outer end of the upper rocker arm connecting pin 53 and is arranged to successively engage the surfaces 72, 71 and 73 of the return arm as the slide 11 is moved to its extreme inner position. In the event that the rocker arm roller 48 does not descend into the recess 49, the roller 74 will be engaged with the inclined surface 71 of the return arm and force the forward end 51 of the rocker arm upwardly and thus positively opening the cut-off tools.

Carried by the side plate 29 is a front wire guide 75 through which the wire stock 76 is fed. The wire is also fed inwardly through a rear wire guide 77 which is carried by the toggle plate 25. The rear guide carries a wire clamp 78 which comprises a plunger 79 forced inwardly by means of a helical spring 80. A screw 81 is arranged at the outer end of the clamp body 82. The inner end of the plunger 79 engages with the blank 83 which has been cut from the stock 76. The front wire guide 75 is preferably formed with an annular recess 84 with which a screw 85 passing through the side plate 26 is engaged. The rear wire guide 77 is held in place by a clamp plate 86 which engages a recess 87 formed in the guide and it is held in place by means of a bolt 88 passing into the toggle frame 25. The wire guide clamp 78 may have its body 82 screwed into the guide itself or it may be carried as shown by a separate plate 89 secured to the guide.

As hereinbefore indicated, when the slide 11 is in the position shown in Figs. 1 and 2, the cutting tools 40 will be in their closed positions, as shown in the other figures of the drawings. When, however, the slide is returned to its rear position, the front and rear cutter arms will have their upper ends oscillated toward each other through the medium of the return links 60 and the cutting tools will be separated so as to provide passage for the stock 76 which is to form the next blank 83. When the cutting dies are in open positions a bushing 96 carried by the slide 11 (shown in dotted lines in Fig. 1) and having an opening therethrough for the reception of a blank will be opposite the front guide 75 and in registering position therewith. When the first blank is cut off and the stock 76 is fed, this blank will be pushed forwardly into the front guide 75 where it will be frictionally held by the wire clamp 78 during the next reciprocal movement of the slide. When the slide returns again on its next stroke another blank 83 will have been cut off and this will now be fed forwardly like the previous blank. The first blank will now be pushed forwardly into the bushing 96 carried by the slide where it will be frictionally held by means of a wire clamp (not shown) similar to the wire clamp 78. The second blank now occupies the position in the front guide 75 previously occupied by the first blank. The next movement of the wire stock 76 will move the three blanks another step forwardly, which will feed the same first blank into the link forming machine against a stop (not shown) where it will be bent into a link in well known manner. The second blank will by the same movement be fed into the bushing 96 of the slide and the third blank will be fed into the front guide 75. Each movement of the former slide 11 forwardly serves to actuate the cut-off mechanism through the medium of the inclined insert 50 and rocker arm 45, thus bringing the cut-off tools 40 inwardly toward each other, severing the stock and forming another blank 83.

As shown in Figs. 3 and 6, the blank 83 is formed at each end with a chisel shaped point 95 of substantial V-shape, but preferably stepped, as hereinbefore described, because of the stepped arrangement of the cutting surfaces of the tools 40. When the blank is formed into a link, the V-shaped chisel edges at the ends will come into contact and in juxtaposition with each other, lying preferably in the same plane and at right angles to the plane passing through both sides of the link, and ready for subsequent welding.

Instead of using the return arm 70, I may, if desired, use a spring on the rocker arm to perform the function of the return arm. These and other modifications of the details herein shown and described may be made without departing from the spirit of my invention or the scope of the appended claims, and I do not, therefore, wish to be limited to the exact embodiment herein shown and described, the form shown being merely a preferred embodiment thereof.

Having thus described my invention, what I claim is:

1. A device for forming chain link blanks with V-shaped ends comprising a housing, oppositely arranged cutter arms pivotally carried by the housing, chisel edged cutters carried at the lower ends of the arms, a rocker arm for oscillating the cutter arms, and toggle means connecting the rocker arm with the cutter arms.

2. A device for forming chain link blanks with V-shaped ends comprising a housing, oppositely arranged cutter arms pivotally carried by the housing, chisel edged cutters carried at the lower ends of the arms, the upper ends of the cutter arms being formed with cylindrically shaped surfaces, a rocker arm for actuating the cutter arms, a rocker arm connection carried by the rocker arm and formed with a cylindrically shaped lower end, and a toggle spacer between the cylindrically shaped lower end of the rocker arm connection and each of the cylindrically formed upper ends of the cutter arms.

3. A device for forming chain link blanks with V-shaped ends comprising a housing, oppositely arranged cutter arms pivotally carried by the housing, chisel edged cutters carried at the lower ends of the arms, the upper ends of the cutter arms being formed with cylindrically shaped surfaces, a rocker arm for actuating the cutter arms, a rocker arm connection carried by the rocker arm and formed with a cylindrically shaped lower end, a toggle spacer between the cylindrically shaped lower end of the rocker arm connection and each of the cylindrically formed upper ends of the cutter arms, and return links connecting the lower end of the rocker arm connection with the upper ends of the cutter arms.

4. A device for forming chain link blanks with V-shaped ends comprising a toggle frame and a side plate arranged in interspaced relation with the toggle frame, front and rear cutter arms disposed between the toggle frame and side plate, the cutter arms having outwardly projecting cylindrical portions for engagement with recesses formed in the toggle frame and side plate, a lower toggle arm pin disposed between the cutter arms and passing through the recesses in the toggle frame and side plate, V-shaped cutters carried at the lower end of the cutter arms, a rocker arm for actuating the cutter arms and toggle means for connecting the rocker arm with the cutter arms.

5. A device for forming chain link blanks with V-shaped ends comprising a toggle frame and a side plate arranged in interspaced relation with the toggle frame, front and rear cutter arms disposed between the toggle frame and side plate, the cutter arms having outwardly projecting cylindrical portions for engagement with recesses formed in the toggle frame and side plate, a lower toggle arm pin disposed between the cutter arms passing through the recesses in the toggle frame and side plate, V-shaped cutters carried at the lower end of the cutter arms, the upper ends of the cutter arms being formed with cylindrical surfaces, a rocker arm for actuating the cutter arms, a rocker arm connection carried by the rocker arm, the lower end of the connection being formed with a cylindrical surface, and toggle spacers arranged between the cylindrical surface of the lower end of the rocker arm connection and the cylindrical surfaces of the upper ends of the cutter arms.

6. A device for forming chain link blanks with V-shaped ends comprising a housing, oppositely arranged cutter arms pivotally carried by the housing, chisel edged cutters carried at the lower ends of the arms, the upper ends of the cutter arms being formed with cylindrically shaped surfaces, a rocker arm for actuating the cutter arms, a rocker arm connection carried by the rocker arm and formed with a cylindrically shaped lower end, a toggle spacer between the cylindrically shaped lower end of the rocker arm connection and each of the cylindrically formed upper ends of the cutter arms, return links connecting the lower end of the rocker arm connection with the upper ends of the cutter arms, connection guide blocks slidably mounted in the toggle frame and side plate, and a lower rocker arm connection pin passing through the lower end of the rocker arm connection, the return links and the connection guide blocks.

7. A device for forming chain link blanks with V-shaped ends comprising a housing, oppositely arranged cutter arms pivotally carried by the housing, chisel edged cutters carried at the lower ends of the arms, each cutter having stepped V-shaped cutting surfaces, the angle which each successive step makes with the axis of the tool increasing from the point backwardly to the body part of the tool, a rocker arm for oscillating the cutter arms, and toggle means connecting the rocker arm with the cutter arms.

8. A device for forming chain link blanks with V-shaped ends comprising a housing, oppositely arranged cutter arms pivotally carried by the housing, chisel edged cutters carried at the lower ends of the arms, a rocker arm for oscillating the cutter arms, and toggle means connecting the rocker arm with the cutter arms, the cutters, the cutter arms and substantially all of the parts of such toggle means lying in substantially the same plane, whereby such parts are placed under compression when the toggle joint is being actuated.

FRANK E. STAHL.